Sept. 2, 1947.                H. S. BEAN ET AL                2,426,585
                        SHOCK ABSORBING LANDING GEAR
                    Filed Jan. 15, 1946        3 Sheets-Sheet 1
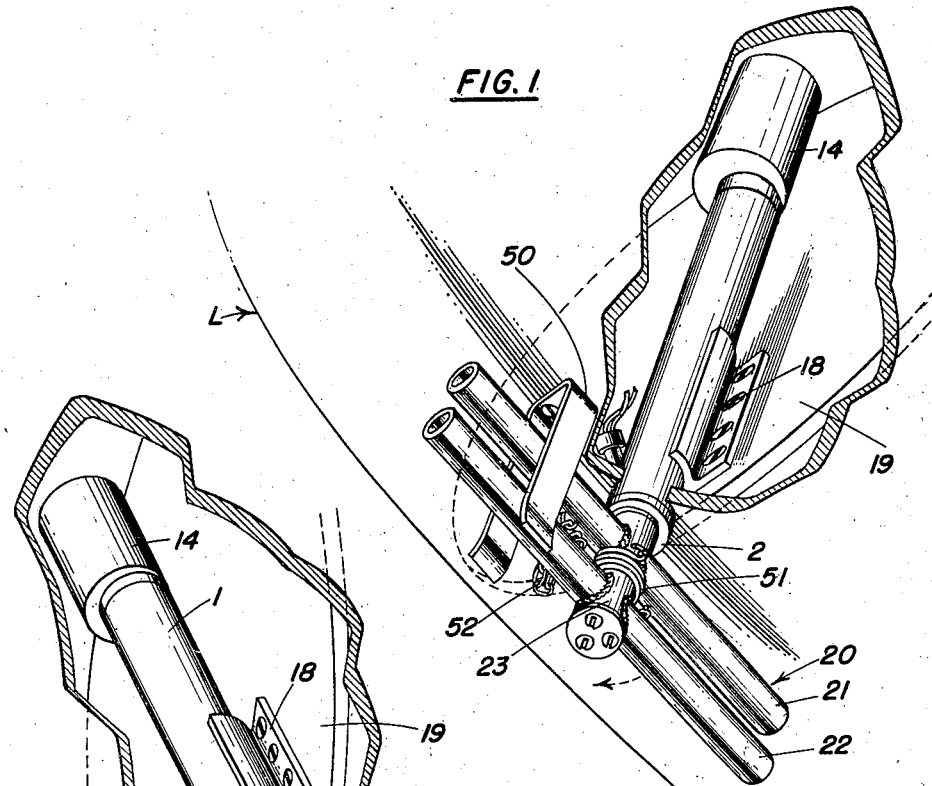
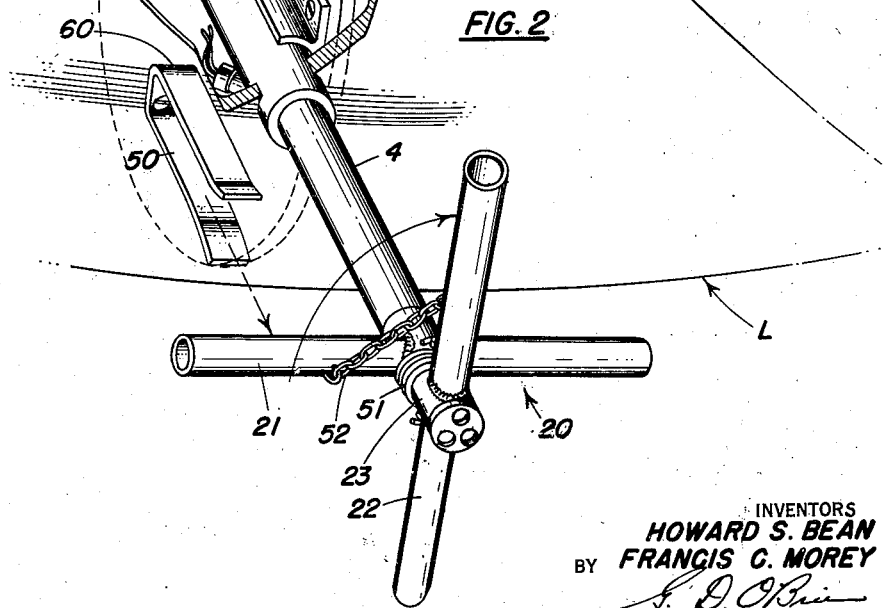
INVENTORS
HOWARD S. BEAN
BY FRANCIS C. MOREY
ATTORNEY Sept. 2, 1947.   H. S. BEAN ET AL   2,426,585
SHOCK ABSORBING LANDING GEAR
Filed Jan. 15, 1946   3 Sheets-Sheet 2
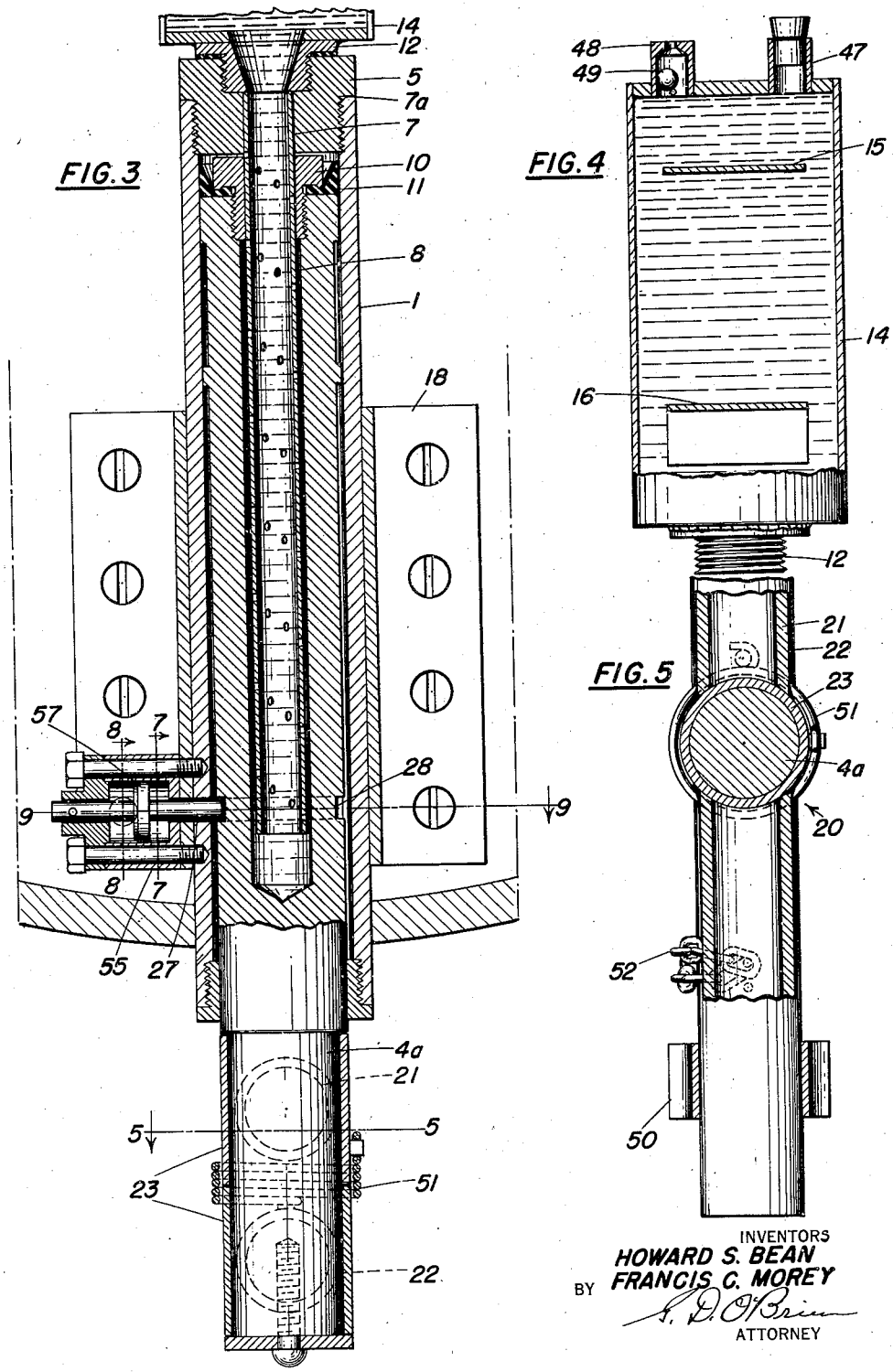
INVENTORS
HOWARD S. BEAN
FRANCIS C. MOREY
BY
ATTORNEY

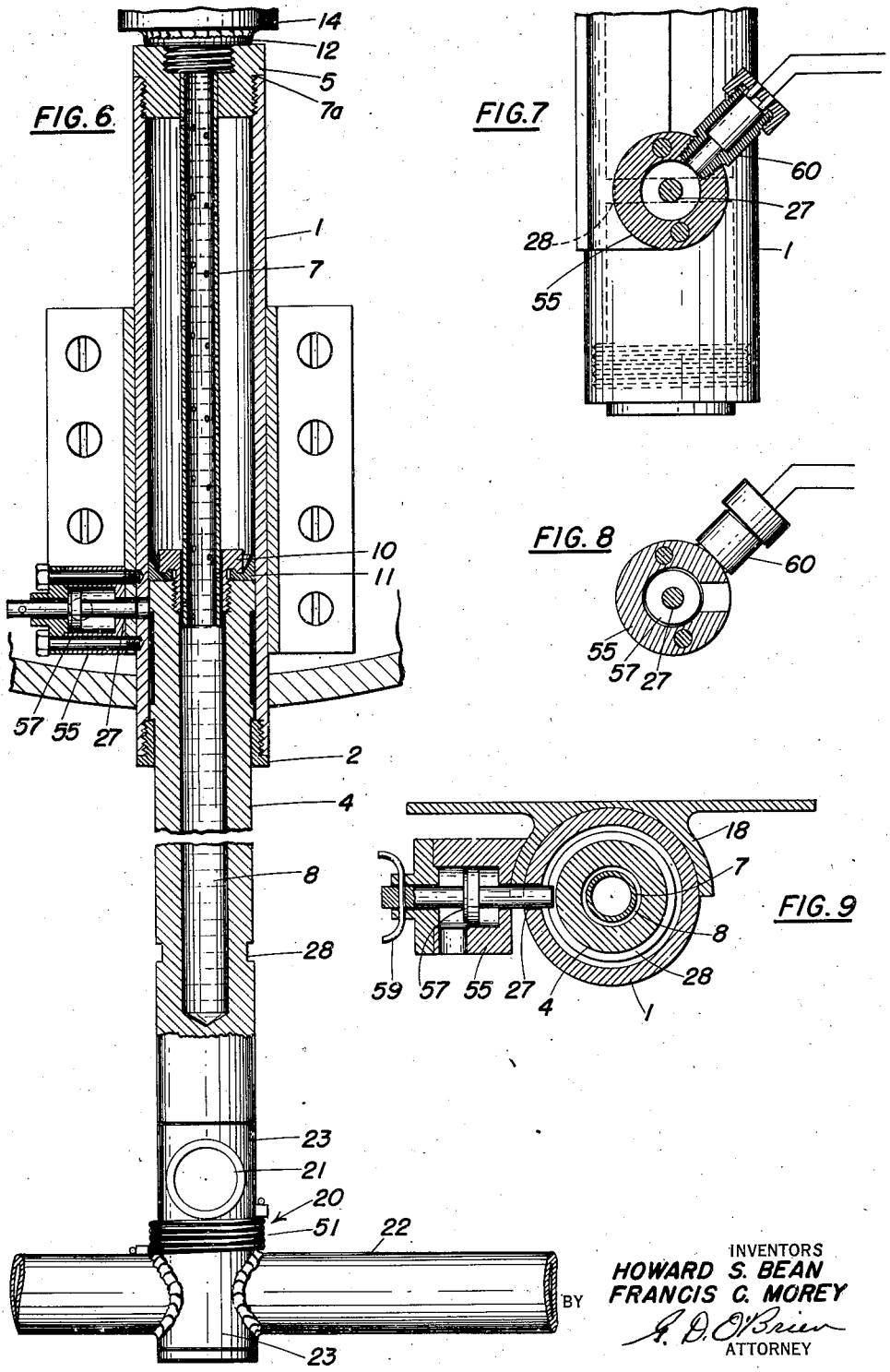

Patented Sept. 2, 1947

2,426,585

UNITED STATES PATENT OFFICE 2,426,585

SHOCK ABSORBING LANDING GEAR

Howard S. Bean and Francis C. Morey, Kensington, Md., assignors to United States of America, as represented by the Secretary of the Navy Application January 15, 1946, Serial No. 641,361

2 Claims. (Cl. 244—138)

(Granted under the act of March 3, 1883, as amended April 30, 1928; 370 O. G. 757)

This invention relates to landing gear for aircraft and particularly to improved means adapted to facilitate the safe landing of parachute-borne aircraft components or cargoes.

An important object of the invention is to provide an improved landing gear of the character indicated which is very light, simple and compact in construction, of rugged character and accordingly not apt to get out of order, and which is capable of handling loads of at least several hundred pounds while reducing the shock of landing of such loads to such extent as to provide effective protection even for highly breakable materials such as delicate recording instruments and the like.

Another object of the invention is to provide such a landing gear formed principally of concentric tubular elements and incorporating novel cushioning means adapted to control the rate of deceleration of the load, the cushioning means including a metering tube provided with a series of orifices, the diameter and positioning of which are such that a fluid, which must be forced therethrough during the landing operation, is permitted to pass at a controlled rate which effectively and gradually absorbs the shock of landing over a relatively considerable period of time.

Another object of the invention is to provide an improved landing gear of the type indicated having shock absorbing elements provided with collapsible foot portions so mounted and arranged as to impose the minimum parasitic air resistance and which automatically open when the landing gear is brought into operation, to provide a large and effective area of ground contact.

Other objects and advantages will become apparent during the course of the following description, taken in conjunction with the drawings forming a part hereof, throughout the several views of which like reference characters designate equivalent parts.

In the drawings:

Figure 1 is a fragmentary perspective view of the fuselage of a glider provided with landing gear incorporating the principles of our present invention, showing the landing gear installed and retracted, a portion of the fuselage being broken away to afford a better view of the landing gear assembly.

Figure 2 is a similar perspective view from below but showing the landing gear projected and the parts in the positions they occupy when ready for operation, but before contact with the ground.

Figure 3 is a substantially central longitudinal sectional view of the shock absorber mechanism with the parts in retracted position.

Figure 4 is a view partly in substantially diametric longitudinal section and partly in side elevation of the reservoir for hydraulic fluid which forms a part of and is connected to the shock absorber mechanism.

Figure 5 is a sectional elevational view, partly broken away, taken substantially on the line 5—5 of Figure 3 and looking in the direction of the arrows.

Figure 6 is a central vertical sectional view similar to Figure 3, but on a smaller scale, showing the parts extended, portions being broken away.

Figures 7, 8 and 9 are cross-sectional views taken substantially on the lines 7—7, 8—8 and 9—9 respectively of Figure 3 and looking in the direction of the arrows.

The drawings illustrate a single complete shock absorbing landing device, although it will be understood that a plurality of these may be used upon the item, gear or craft to be landed, the rate of descent of which prior to landing will be controlled by a parachute (not shown).

As shown in Figures 1 and 2, the unit is installed in substantially vertical position, with a landing foot portion 20 depending from the body to be landed. The body to be landed is fragmentarily illustrated as a glider fuselage, designated L. The main cylinder 1 is bracketed at 18 to a bulkhead 19 of the fuselage. The lower end of the cylinder, which projects slightly below the fuselage, is provided with an annular head 2 screwed in place and through which the combined piston and rod assembly 4 slides. The upper cylinder head 5 is also of annular form and retains an axially disposed metering tube 7 which projects into the cylinder. A gasket 7a may be disposed between the cylinder and the head. The piston portion 4 is longitudinally bored as indicated at 8 to receive the metering tube 7. The piston packing 11 is retained by an annular retaining element 10 which has a snug sliding fit with the metering tube. Attached to the head as by means of a connecting nipple 12 screwed into the upper end thereof is a reservoir 14 for the hydraulic fluid. The hydraulic fluid may consist of equal parts of alcohol and castor oil. The reservoir, best shown in Figure 4, is provided at its upper end with a filler plug 47 and a ball check valve 48. The valve ball permits entry of air when the piston drops and escape of air when the reservoir is being filled, but closes in event of inverting of the aircraft or cargo, to prevent escape of the fluid. Baffle plates 15, 16 within the reservoir break up the jet of fluid issuing from the metering tube 7 as the piston 4 is forced into the cylinder 1.

Mounted upon the reduced lower extremity 4a of the piston and rod assembly 4 is a "crow-foot" landing element generally designated 20 consisting of a pair of transverse arms centrally pivoted upon the rod section 4a and swingable from an inactive position in which they lie parallel to one another, to a crossed operative position in which they extend transversally with respect to one another. Each such rotatable foot section includes a hub 23 and a pair of tubular arms 21, 22 welded to and projecting radially from the hub, as best shown in Figures 1 and 2. A torsion spring 51, wrapped about the adjacent hub portions 23 of the two foot assemblies reacts in opposite angular directions against such foot portions, tending to swing them to perpendicular position, their rotary movement under the influence of the spring being limited by a check chain 52. When the piston rod assembly is in the raised, retracted position of flight, shown in Fig. 1, the crow-foot portions are held in parallel relation by a U-bracket 50, from which the foot portion is automatically freed as it is lowered to operative position, allowing the foot portions to immediately swing to their crossed, operative relationship as shown in Fig. 2. Where the gear is used upon a glider the foot portions when retracted are preferably held by the bracket 50 in parallel relation to the line of flight.

During flight the piston and connected foot assembly are held in raised position by means of a laterally slidable detent pin 27 projected through the side of the cylinder into engagement with a peripheral slot 28 in the piston wall. The detent pin projects slidably through a small cylinder 55 attached to the side of cylinder 1, a piston 57 being carried by the pin within cylinder 55. A small release cylinder 60 attached to the side of cylinder 55 houses an electrically operable squib or primer and communicates interiorly with the cylinder 55 upon the side of piston 57 nearest the large cylinder 1. The detent pin 27 is normally maintained in its projected, locking position in engagement with the slot 28 by means of a shear wire 59.

When the squib is fired, the piston 57 is forced back, shearing wire 59 and freeing the detent from the piston assembly, which then falls under gravity to the extended position of Fig. 2, the crow-foot portions moving to their crossed relationship as soon as released from the bracket 50. Air enters the reservoir 14 through the check valve 48 during such extension. The metering tube is provided with a plurality of metering orifices selectively sized and positioned to provide desired cushioning characteristics upon landing. As the gear is projected during the descent, hydraulic fluid filters through the metering orifices, filling the space between the metering tube and cylinder 1. When the foot assembly strikes the ground, and the cylinder is forced downwardly over the piston assembly, the hydraulic fluid is forced out of the space between the metering tube and cylinder 1 and back into the reservoir through the metering orifices, which thus control the rate of telescopic movement and therefore the rate of descent of the load.

The invention herein described may be manufactured and used by or for the Government of the United States of America for governmental purposes without the payment of royalties thereon or therefor.

We claim:

1. A landing gear for parachute-borne loads, comprising a buffer assembly, a rod connected to the buffer assembly and controlled in its rate of movement thereby, a ground-engaging foot assembly carried by said rod, said foot assembly comprising a plurality of foot portions swingable around the longitudinal axis of the rod in a plane substantially perpendicular thereto, means tending to swing said portions to a diverging operative position, and means for holding said portions in an inoperative position at desired times.

2. A landing gear for parachute-borne loads, comprising a buffer assembly, a rod connected to the buffer assembly and controlled in its rate of movement thereby, said rod also being movable from a retracted position to a projected operative position independently of the buffing action, a plurality of foot portions swingable around the longitudinal axis of the rod in a plane substantially perpendicular thereto, means for holding said foot portions in an inoperative position when said rod is retracted, means for releasing said foot portions and for swinging the same to operative diverging positions when said rod is projected.

HOWARD S. BEAN.
FRANCIS C. MOREY.

REFERENCES CITED

The following references are of record in the file of this patent:

UNITED STATES PATENTS

| Number | Name | Date |
|---|---|---|
| 1,385,770 | Barling | July 26, 1921 |
| 1,780,531 | Messier | Nov. 4, 1930 |
| 2,371,640 | Manson | Mar. 20, 1945 |

FOREIGN PATENTS

| Number | Country | Date |
|---|---|---|
| 297,202 | Great Britain | Sept. 20, 1928 |